United States Patent [19]

Lord

[11] Patent Number: 5,020,321
[45] Date of Patent: Jun. 4, 1991

[54] EXHAUST POWERED WASTE PROCESSING UNIT

[76] Inventor: Carter K. Lord, 2433 N. Perry Park Rd., Sedalia, Colo. 80135

[21] Appl. No.: 442,995
[22] Filed: Nov. 29, 1989
[51] Int. Cl.⁵ .......................... F01N 3/02; C02F 1/72
[52] U.S. Cl. ........................................ 60/317; 4/111.1; 4/458; 210/251
[58] Field of Search ................. 60/317, 310; 110/238; 210/251; 4/111.1, 458

[56] References Cited

U.S. PATENT DOCUMENTS

| | | | |
|---|---|---|---|
| 2,565,720 | 8/1951 | Collison | 4/111.1 |
| 3,098,144 | 7/1963 | Dale | 4/111.2 |
| 3,342,337 | 9/1967 | Reid | 210/181 |
| 3,731,490 | 5/1973 | Sargent | 60/317 |
| 3,775,978 | 12/1973 | Body | 60/317 |
| 3,882,799 | 5/1975 | Sargent | 60/317 |
| 3,925,827 | 12/1975 | Wagenhals | 60/317 |
| 3,933,636 | 1/1976 | Daniels | 60/317 |

Primary Examiner—Douglas Hart
Attorney, Agent, or Firm—Donald W. Margolis

[57] ABSTRACT

The invention relates to a device for efficiently disposing of human waste material without the use of power or expendables other than waste heat and flow resulting from the normal operation of an internal combustion engine. Human waste is inserted into an incineration chamber located in the engine exhaust system, is incinerated by the engine exhaust heat, and the resultant ash is expelled from the system by the flow of engine exhaust gasses. The device may be utilized for the disposal of human waste generated by personnel on board various motor vehicles, i.e. various combat vehicles (armored personnel carriers, tanks, command post vehicles, etc.), and is easily adaptable for marine (i.e. various types of boats) or various other applications.

13 Claims, 7 Drawing Sheets

EXHAUST POWERED WASTE PROCESSING UNIT

ORIGIN OF THE INVENTION

Portions of the invention described herein were conceived by the inventor while working on developmental research for the specific purpose of developing a viable waste disposal system for combat vehicles. The inventor continued the development of the invention to bring it to the current level of definition as described herein.

BACKGROUND OF THE INVENTION

The invention relates to a device for providing efficient processing of human waste generated by the crew of a motorized vehicle without the use of energy (other than waste energy) or expendable materials. The primary purpose for developing this system was to permit the removal and processing of human waste generated by crews of combat vehicles operating in contaminated environments which prohibit the opening of the vehicle to dispose of waste in a more conventional manner. An additional result of the development of the system was identification of an application for the system, in a modified form, for use in various types of boats, which would process the waste generated more completely than present systems, and require much less space and equipment on board than present systems.

Prior devices have been developed for the processing of human waste by incineration. These devices, such as U.S. Pat. No. 3,098,144 require a power source for the incineration of the waste material such as the introduction of flammable gasses or liquids, or electricity to provide the heat required for incineration, and therefore are not pertinent to the device described herein.

Prior devices have been developed for the disposal of waste utilizing the exhaust gasses from internal combustion engines such as U.S. Pat. Nos. 3,342,337 (and all related patents); 3,731,490 and 3,882,799; 3,775,978; and 3,933,636. These systems require the processing of the waste material either mechanically or chemically into a liquid or semi-liquid state prior to incineration, and also require the use of an external source of power for various functions of the process.

One modification of U.S. Pat. No. 2,565,720 describes the processing of human waste generated on an aircraft which is similar to the device described herein, but lacks positive backflow prevention to the water closet, and requires a separate exhaust line to be provided to the unit to prevent excessive back pressure to the engine. Additionally, this device lacks certain critical internal structures within the calcination chamber, and therefore depends on a long section of exhaust pipe downstream from the device to effect complete incineration of the waste material.

No prior devices developed for the disposal of human waste utilizing exhaust heat for processing address the problem of odor mitigation as is provided by the device described herein.

SUMMARY OF THE INVENTION

It was identified that the safe and efficient disposal of human waste generated by crews within the confines of combat vehicles operating in a NBC (Nuclear, Biological, or Chemical) environment is necessary for the operational efficiency of that vehicle to be maintained over a period of time. A device or system was needed to process and dispose of human waste generated within the confines of a vehicle without requiring the use of additional fuel, or other expendables. The system must also insure that the interior of the vehicle not be contaminated by the outside environment by its operation. As it was anticipated that while not a factor during actual combat conditions, it was also necessary to reduce objectionable odors to a minimum, as the major percentage of operation of this type of vehicle would be in training operations. This feature is also imperative for applications other than military.

An important object of this invention is to provide a convenient, cost effective device which provides for the safe, efficient on board processing and disposal of human waste generated within various types of motorized vehicles.

Another important object of this invention is to provide a means by which human waste can be processed more effectively and efficiently than systems currently used on pleasure boats and other types of marine craft. Current systems of waste management on these type of boats requires a holding tank, a macerator, and a chlorinator for acceptable operation. With the implementation of this invention for this application, only a chlorinator is required, eliminating the power and space requirements of the current systems.

Another important object of this invention is to provide a system which is relatively simple to retrofit into existing vehicles. For the marine application, the processing unit is installed into the exhaust system as close to the engine as practical, and standard plumbing is used to connect the existing head to the unit. For other applications, the invention is used in conjunction with a dry toilet (one which seals the human waste material in plastic bags). A waste disposal port consisting of a rotary transfer chamber with seals to prevent the escape of exhaust gases is mounted atop the waste disposal unit, and receives the bagged human waste from the dry toilet. Operation of a handle rotates the transfer chamber, depositing the bagged human waste into the incineration chamber of the waste disposal unit, where it is incinerated.

Another important object of this invention is to assure that restriction of the exhaust system by a blockage within the incineration chamber (or by unusually large amounts of waste being introduced in a short period of time) is impossible. A bypass chamber is provided which guarantees unrestricted flow of exhaust gases through the unit even if the incineration chamber is completely blocked.

Another important object of this invention is that objectionable odors are reduced to a negligible level by passing the exhaust through a water bath unit prior to release to the atmosphere.

Another important object of this invention is that for the marine application, objectionable odors are reduced to a negligible level by terminating the exhaust just below waterline. This feature has been demonstrated by actual testing, and is consistent with the current configuration of exhaust systems on many types and styles of marine craft.

BRIEF DESCRIPTION OF THE DRAWINGS

The construction designed to carry out the invention will be hereinafter described, together with other features thereof.

The invention will be more readily understood from a reading of the following specification and by refer

DESCRIPTION OF A PREFERRED EMBODIMENT

A waste processing unit A of stainless steel construction throughout, generally consists of an exhaust inlet 10, bypass tube 12, bypass chamber 13, incineration chamber 14, exhaust outlet 15, and a waste introduction port 16. A grating 17 located at the downstream end of the incineration chamber 14 serves to retain the solid waste products in the incineration chamber until rendered to harmless ash, which is expelled from the system by the action of the exhaust gasses and normal vibration of the entire motorized vehicle system. An inspection/cleanout port 18 is provided in the side of the device to permit periodic inspection and removal of foreign objects which may have inadvertently entered the system.

The bypass tube 12 and bypass chamber 13 serve to assure unrestricted flow of exhaust gases through the device despite the condition of the incineration chamber 14, and should be incorporated in all units as they also continue to provide heat to a blocked incineration chamber 14, serving to incinerate the material within and clearing the system.

Flanges 19, 20 and 21 are provided at the exhaust inlet 10, exhaust outlet 15, and waste introduction port 16 respectively to facilitate installation and service as required.

Various waste introduction devices may be installed on the waste processing unit at the Flange 21 to permit utilization of the unit for different applications.

Figure 1:
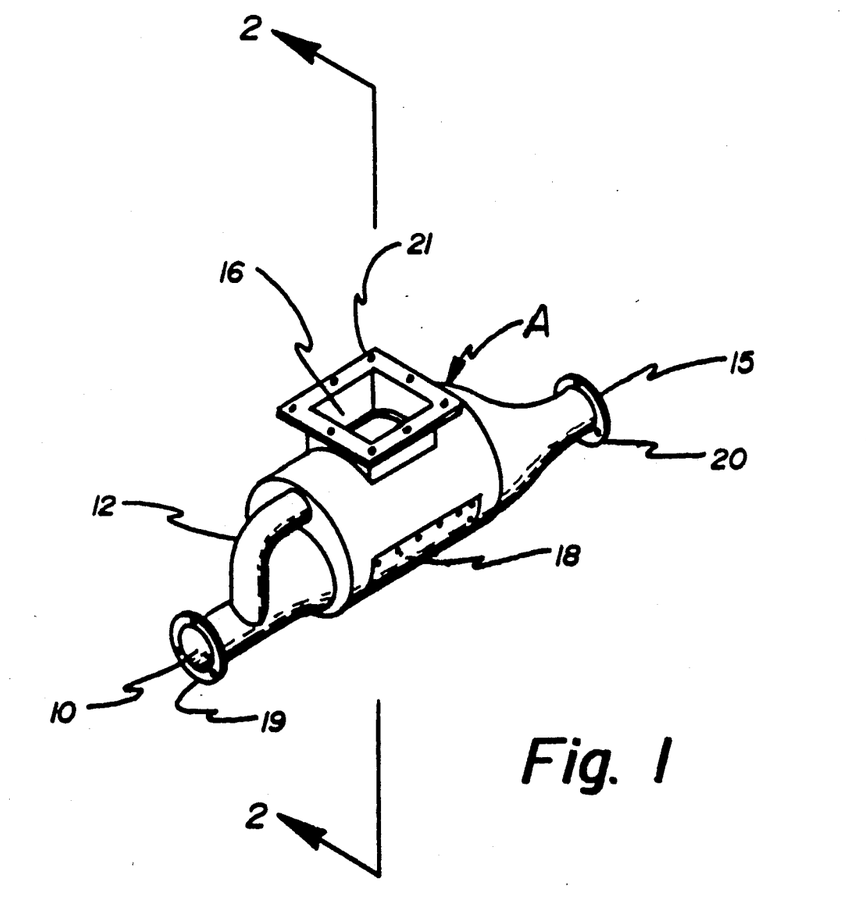
- FIG. 1 is a perspective view illustrating rear view of a representative waste processing unit (insulation is not shown in this figure, neither is the waste introduction device)
Figure 2:
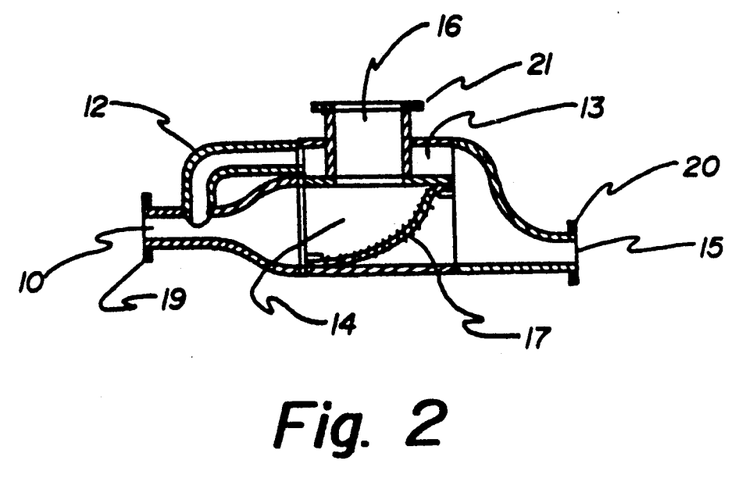
FIG. 2 is a section view of the invention illustrating the internal configuration and features.
Figure 3:
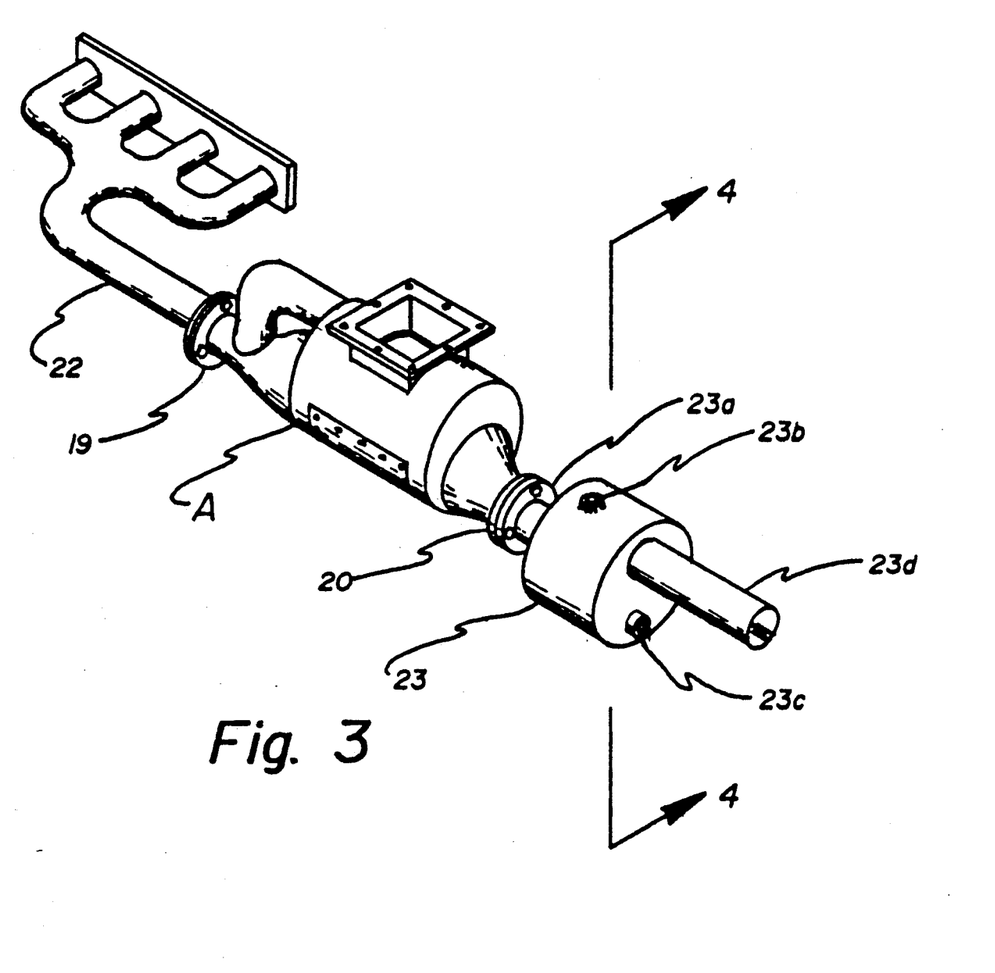
FIG. 3 is a perspective view of the invention illustrating a typical installation including a representative water bath unit.

In a typical installation, the waste processing unit A is installed into the vehicle's main exhaust system as shown in FIG. 3. The exhaust inlet flange 19 is attached to the vehicle's exhaust system 22 with appropriate gaskets and fasteners. The exhaust outlet flange 20 is attached to the inlet flange 23a of the water bath unit 23 with appropriate gaskets and fasteners. The outlet pipe 23d is attached to the vehicle's tailpipe with appropriate gaskets and fasteners (not shown). A water fill port 23b and water drain port 23c provide the capability for periodic changing and filling of the water within the water bath unit 23.

Figure 4:
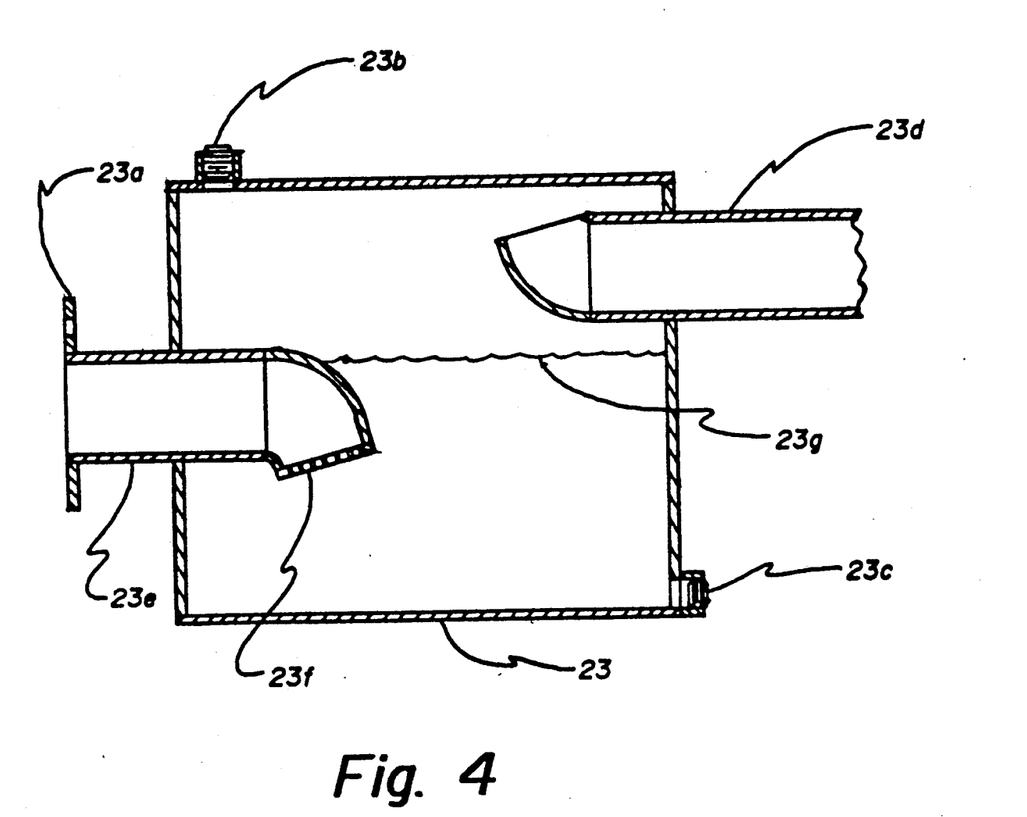
FIG. 4 is a section view of a representative water bath unit.

The water bath unit 23 is used for the elimination of odors generated by waste processing units installed in land based vehicles, and effectively eliminates odors from waste processing as well as precludes entry of contamination into the device from the outside environment. Flow from the waste processing unit A passes into the water bath unit 23 through the inlet pipe 23e and is forced into the water bath through a diffusion plate 23f at the end of the inlet pipe 23e. After passing through the water bath, the exhaust is then routed into the vehicle's tailpipe through the outlet pipe 23d, which is above the surface 23g of the water bath.

Figure 5:
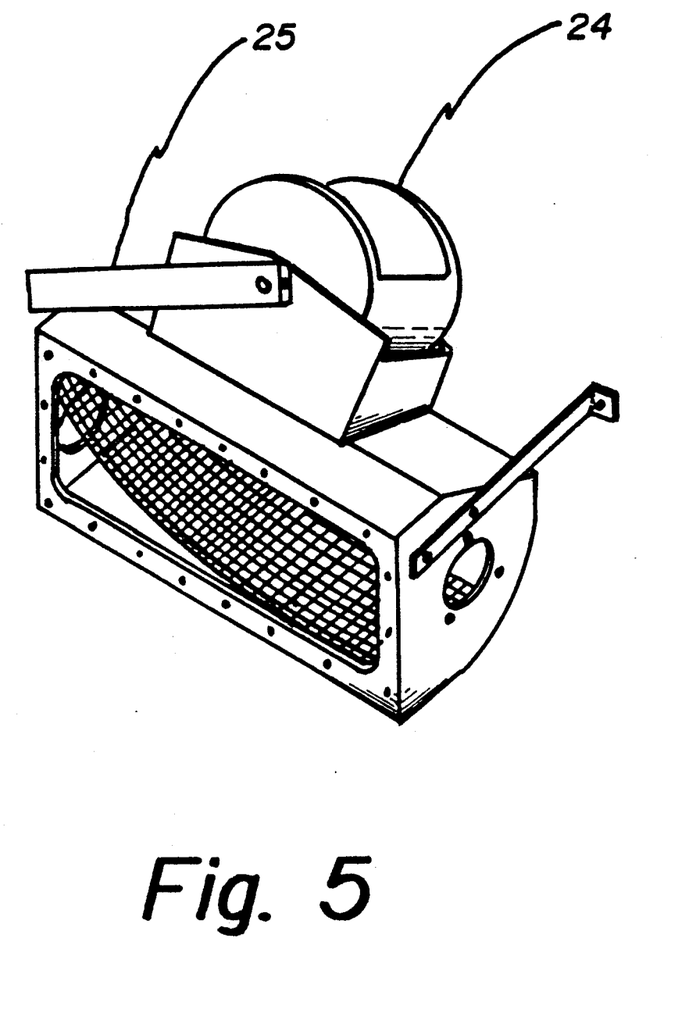
FIG. 5 is a photograph illustrating the waste processing unit with a rotary transfer chamber as an integral part of the device (shown with inspection/cleanout port removed)
Figure 6:
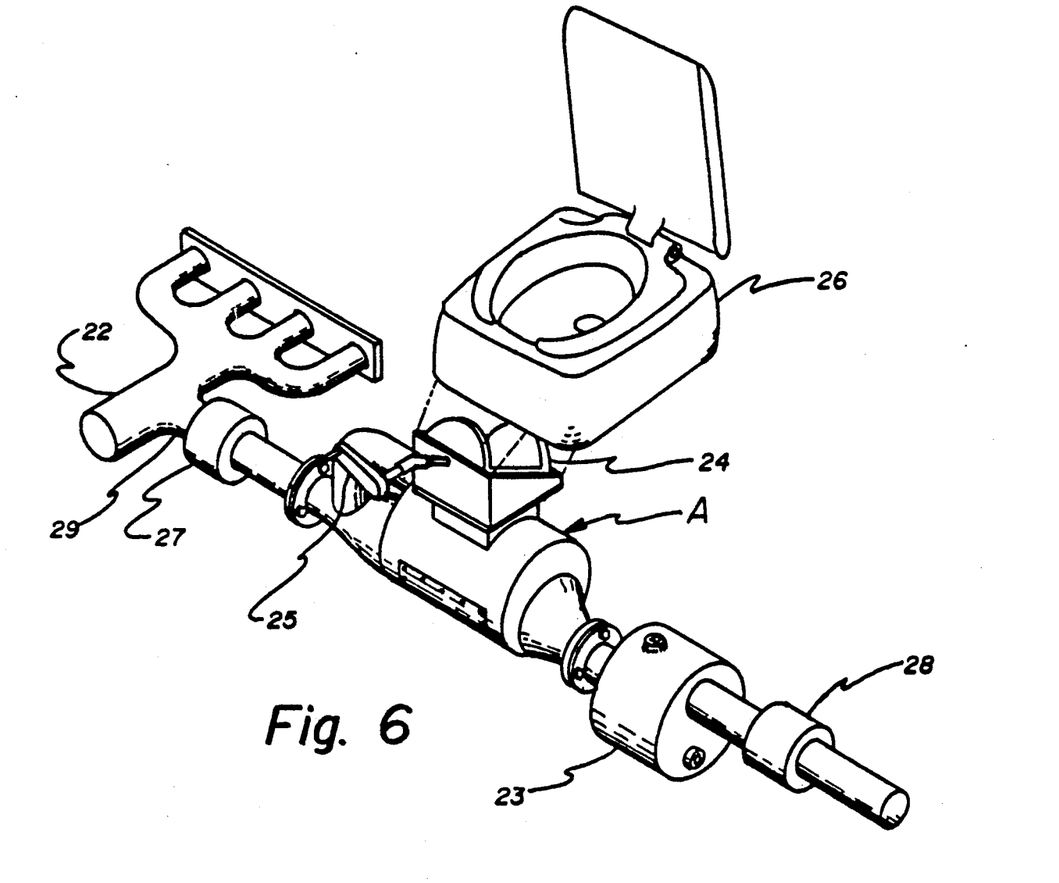
FIG. 6 is a diagrammatical perspective view of a typical installation of the invention which utilizes a bypass exhaust system.
Figure 7:
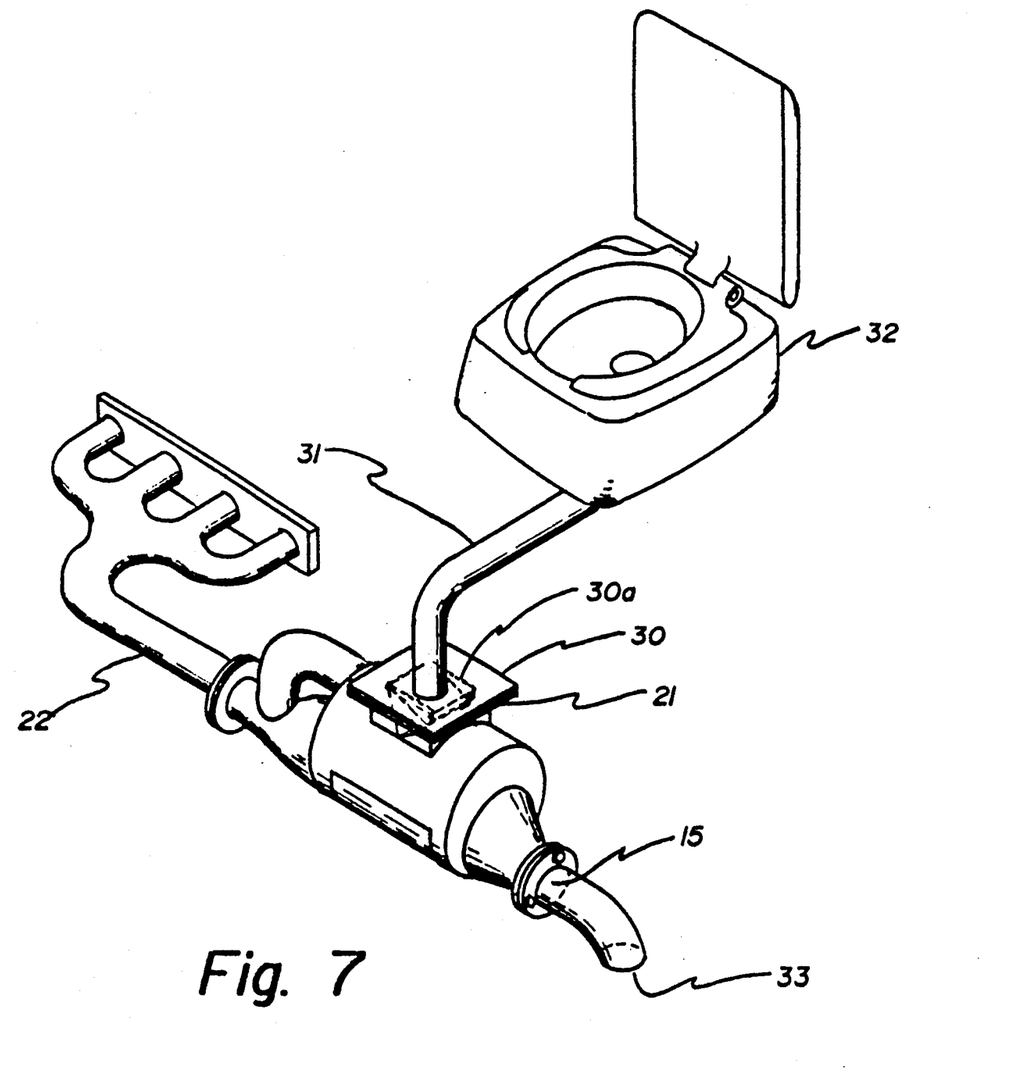
FIG. 7 is a diagrammatical perspective view of a typical installation of the invention for marine applications.

FIG. 5 and FIG. 6 show a rotary transfer chamber 24 mounted atop the waste introduction port 16. Operated by a handle 25, this unit sits directly under a dry toilet 26 and receives waste in sealed bags from the dry toilet. Rotation of the handle 25 places the waste into the incineration chamber 14 for processing. The configuration of the rotary transfer chamber 24 assures that exhaust gasses from the incineration chamber 14 cannot escape up through the waste introduction port 16, regardless of the position of the operating handle 25. Additionally, the internal construction of the rotary transfer chamber 24 incorporates a sealed chamber containing ceramic refractory fiber which keeps the temperature of the chamber below the melting point of the sealed bags.

In the installation depicted in FIG. 4, the flow of exhaust through the device can be controlled by means of valves 27 and 28 located in a bypass branch 29 of the vehicle's exhaust system 22. This configuration serves to further prevent contamination of the interior of the vehicle when operating in a contaminated environment.

FIG. 5 is a typical marine installation, and shows an adaptor plate 30 mounted on the flange 21 which permits attachment of standard plumbing 31 to the device for delivery of waste to the unit for processing. On the underside of the adaptor plate 30 is a spring biased flap valve 30a which permits water and waste material to enter the waste processing unit A while prohibiting exhaust gases from entering the plumbing 31. As water is used as a transfer medium, it is essential that the waste processing unit A be mounted with the exhaust outlet 15 lower than the rest of the device and with the boat's tailpipe sloping slightly downward continuously to the system exhaust outlet 33. A standard marine head 32 is used for collection of waste material in this application. The marine head 32 should incorporate an internal "p" trap to further prohibit exhaust gasses from entering the marine head 32. The system exhaust outlet 33 should be located just below waterline as this has been shown by testing to eliminate the odor generated by the device in operation.

Not shown in FIGS. 1 through 7 is an insulating blanket of ceramic refractory fiber installed over the entire device from the exhaust inlet 10 to the water bath unit 23 to prevent heat loss in the system in order to enhance efficiency of operation. Depending on the installation, this insulating blanket may be installed upstream to the engine manifold. An additional layer of protective metal foil is installed over the insulating blanket to minimize damage to the insulating material.

While a preferred embodiment of the invention has been described using specific terms, such description is for illustrative purposes only and it is to be understood that changes and variations may be made without departing from the spirit or scope of the follwing claims.

What is claimed is:

1. In the combination of the exhaust from an internal combustion engine, a waste processing unit and an appropriate system for introducing human waste into the waste into the waste processing unit, wherein said waste processing unit comprises:

an internal configuration which provides for a bypass route for engine exhaust which precludes restriction of normal exhaust flow;

an incinerating chamber which incorporates a sloped grating at the outlet end to retain solid waste material for processing;

turbulent flow of exhaust gases within the incineration chamber to adequately process the waste material;

a flange for mounting to the exhaust manifold of an internal combustion engine;

a flange for mounting to the exhaust pipe of a vehicle's exhaust system;

a flange for attaching an appropriate waste delivery system to the waste processing unit;

an access port to permit inspection and cleaning of the incineration chamber;

all stainless steel construction;

gaskets which are capable of withstanding 1880 deg. F. continuously; and an insulating blanket of ceramic refractory fiber insulating, with an outer covering of protective metal foil.

2. The device of claim 1 including a rotary transfer chamber to permit insertion of waste material into the waste processing unit by operation of a handle which also precludes exhaust gasses from the incineration chamber from entering the waste introduction system.

3. The device of claim 2 wherein the device is mounted under a system which seals human waste in plastic bags, and the plastic bags are deposited automatically into the rotary transfer chamber which then is rotated to insert the waste into the waste processing unit.

4. The device of claim 1 wherein operation of said appropriate waste delivery system and flow of exhaust into and out of said waste processing unit is controlled by control means for eliminating the chance of contaminating the interior of a vehicle.

5. The device of claim 1 wherein the device is mounted in a marine application, and the exhaust is terminated below the waterline to eliminate odors during operation, and wherein flush water is chlorinated to meet health requirements.

6. The device of claim 1 including a device positioned downstream of the incineration chamber within which the exhaust gasses are passed through a water bath before release into the atmosphere for the purpose of mitigation of objectionable odors.

7. A waste processing unit which utilizes the exhaust heat from an internal combustion engine which is connected to an exhaust manifold and an exhaust pipe to incinerate waste to ash and the flow of the internal combustion engine gas to expel the resultant ash, wherein said waste processing unit comprises, in combination:

means for bypassing hot engine exhaust from an internal combustion engine;

an incinerating chamber, said incinerating chamber including in inlet opening for receiving exhaust gases from said bypassing means, and an outlet opening for expelling exhaust gases from said incinerating chamber;

means for delivering waste to said incinerating chamber;

means within said incinerating chamber for retaining solid waste material for processing; and means for providing turbulent flow of exhaust gases within said incinerating chamber to incinerate solid waste material in said incinerating chamber; whereby, the exhaust heat from an internal combustion engine is directed by said bypassing means to said inlet opening of said incinerating chamber to incinerate waste retained within said incinerating chamber to ash, and wherein further the flow of the gases from the internal combustion engine expels the resultant ash from said incinerating chamber through said outlet opening.

8. The waste processing unit of claim 7 wherein there are included means for connecting said inlet opening of said incinerating chamber to the exhaust manifold of an internal combustion engine and means for connecting said outlet opening of said incinerating chamber to an exhaust pipe.

9. The waste processing unit of claim 7 wherein said incinerating chamber includes an access port to permit inspection and cleaning of said incinerating chamber.

10. The waste processing unit of claim 7 wherein said means for retaining solid waste within said incinerating chamber includes a sloped grating juxtaposed to said outlet opening.

11. The waste processing unit of claim 7 wherein a rotary transfer chamber is connected to said incinerating chamber to permit insertion of waste material into said incinerating chamber, thereby precluding exhaust gases from said incinerating chamber from exiting through said rotary transfer chamber.

12. The waste processing unit of claim 7 wherein said unit includes means for controlling waste introduction and the flow of exhaust into and out of said incinerating chamber.

13. The waste processing unit of claim 7 wherein a liquid bath system is positioned downstream of said incinerating chamber through which exhaust gasses are before releasing them into the atmosphere.

* * * * *